Dec. 25, 1962 R. L. LARSON ET AL 3,070,704
ELECTRICAL SYSTEM
Filed Sept. 15, 1958 4 Sheets-Sheet 1
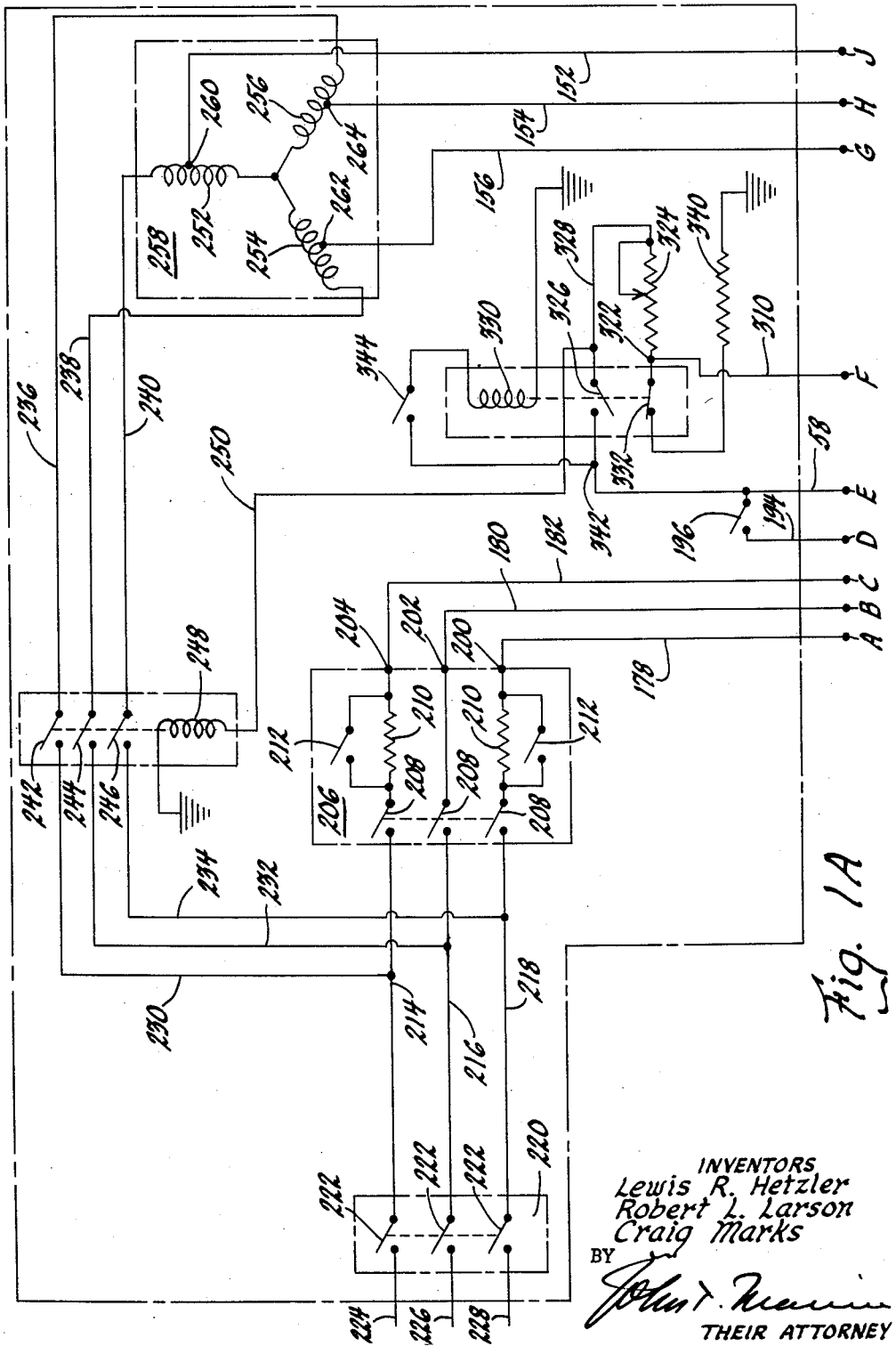
Fig. 1A
INVENTORS
Lewis R. Hetzler
Robert L. Larson
Craig Marks
BY
THEIR ATTORNEY

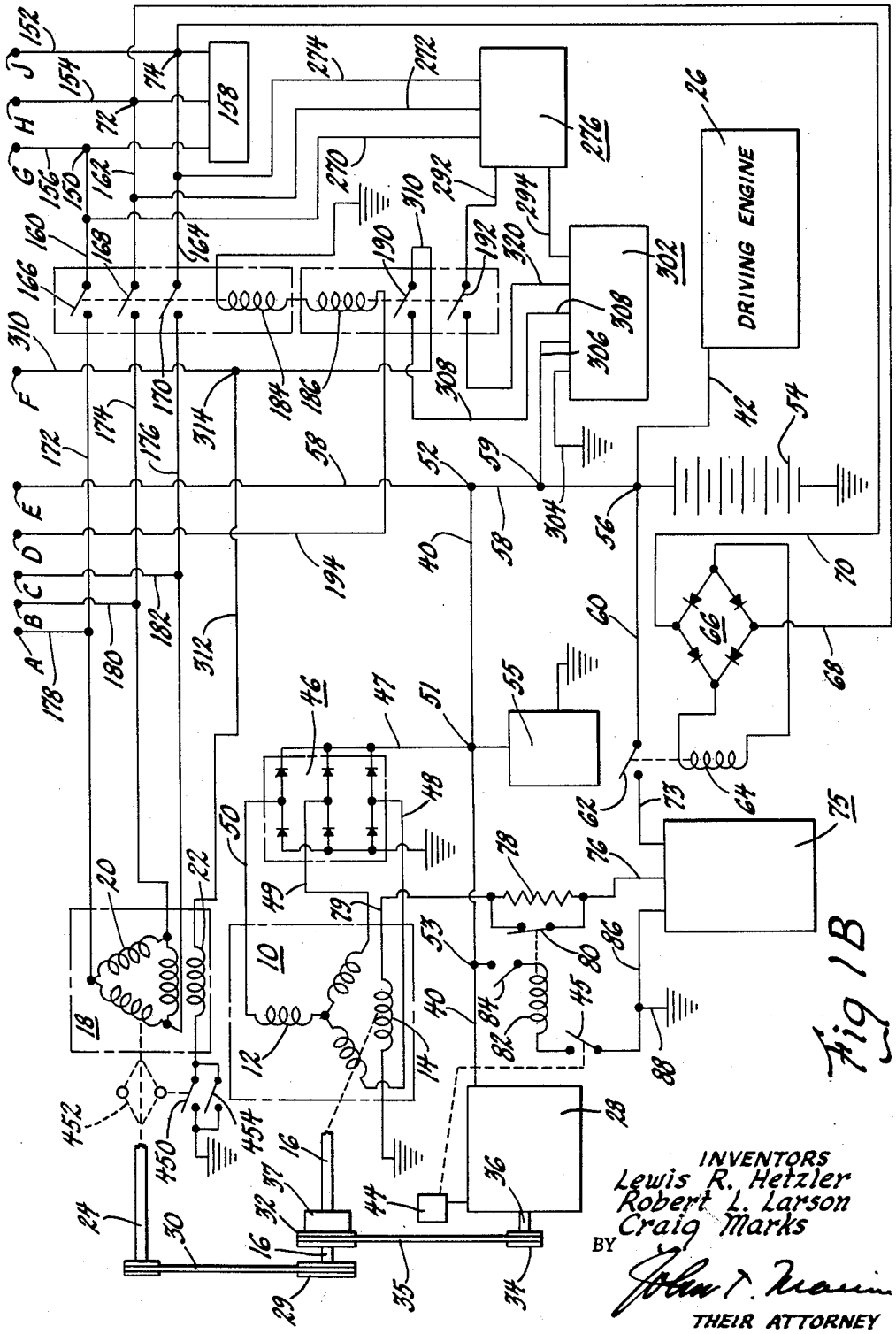

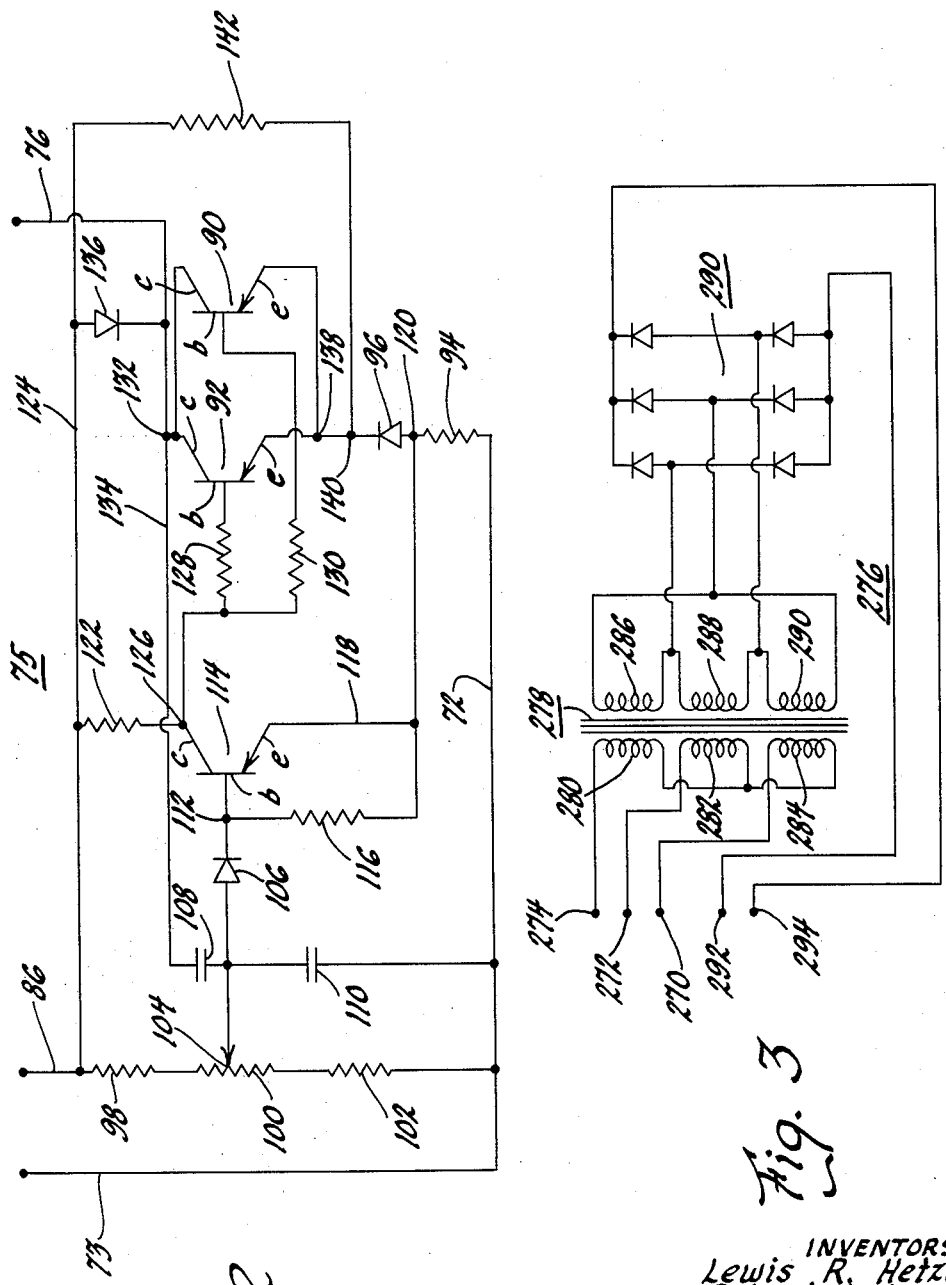

United States Patent Office 3,070,704
Patented Dec. 25, 1962

3,070,704
ELECTRICAL SYSTEM
Robert L. Larson and Lewis R. Hetzler, Anderson, Ind., and Craig Marks, Grosse Pointe Woods, Mich., assignors to General Motors Corporation, Detroit, Mich., a corporation of Delaware
Filed Sept. 15, 1958, Ser. No. 761,082
6 Claims. (Cl. 290—4)

This invention relates to electrical systems and more particularly to motor vehicle electrical systems. By motor vehicle electrical systems, it is meant that the invention relates to electrical systems for any motor-driven conveyance, whether it be a land vehicle, a ship or airplane.

It is an object of this invention to provide an electrical system for a vehicle that has a prime mover for supplying motive power to the vehicle and an auxiliary engine that is used to power the electric generating equipment of the vehicle.

Another object of this invention is to provide a vehicle electrical system that includes generating equipment for supplying the D.C. loads of a vehicle and which also includes generating equipment for supplying a constant frequency A.C. voltage to the A.C. loads of the vehicle.

Still another object of this invention is to provide a motor vehicle electrical system wherein a pair of dynamoelectric machines are driven from an auxiliary engine and wherein one of the dynamoelectric machines may be operated as a motor or a generator. When the one dynamoelectric machine operates as a motor, it is fed from a source of voltage and drives the other dynamoelectric machine, which, in turn, supplies the D.C. loads of the vehicle. When the one dynamoelectric machine is operating as a generator, it supplies the A.C. loads of the vehicle and the other machine continues to supply the D.C. loads with both machines being driven by the auxiliary engine.

A further object of this invention is to provide a motor vehicle electric system which includes a pair of A.C. generators, one of which supplies the D.C. loads of the vehicle through a rectifier and the other of which supplies the A.C. loads of the vehicle, the D.C. and A.C. load voltages being controlled by voltage regulating circuits each of which includes at least one transistor.

Another object of this invention is to provide an electrical system for a motor vehicle which includes an A.C. generator for supplying the A.C. loads of the vehicle and wherein field power for the A.C. generator is derived from a D.C. power source, the A.C. generator and D.C. power source both being driven by the same engine.

A further object of this invention is to provide an improved transistor regulator circuit for regulating the output voltage of an A.C. generator that supplies power to the A.C. loads of a motor vehicle. The regulator circuit is connected with a voltage sensing unit which senses the voltage output of the generator and which applies the proper sense voltage to the regulator circuit.

Further objects and advantages of the present invention will be apparent from the following description, reference being had to the accompanying drawings wherein preferred embodiments of the present invention are clearly shown.

In the drawings:

FIGURE 1A is a circuit diagram of a portion of a motor vehicle electrical system made in accordance with this invention.

FIGURE 1B is a circuit diagram of the remainder of the electrical system of this invention.

FIGURE 2 is a circuit diagram of a transistor regulator circuit which forms a component part of the circuit illustrated in FIGURES 1A and 1B.

FIGURE 3 is a circuit diagram of a voltage sensing unit that forms a component part of the electric system of FIGURES 1A and 1B.

Figure 4:
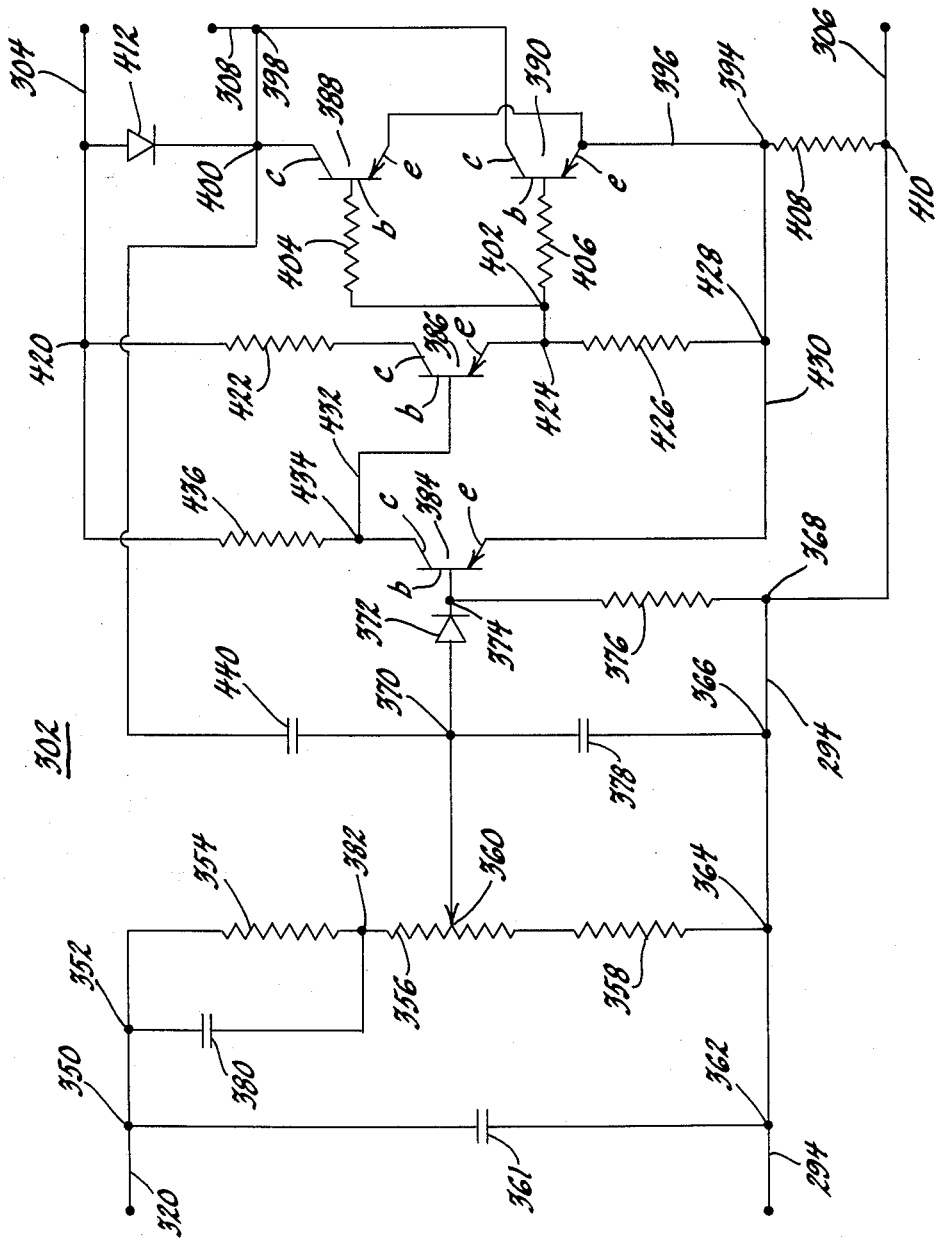
FIGURES 4 is a transistor regulator circuit which forms a component part of the circuit of the FIGURES 1A and 1B.

The motor vehicle electrical system of this invention is illustrated in its entirety in FIGURES 1A and 1B. The circuits shown in these figures are connected to one another through terminals A, B, C, D, E, F, G, H and J so that the circuit in its entirety is represented by FIGURES 1A and 1B connected together as described.

The circuit components of the electrical system illustrated in FIGURES 1A and 1B include an A.C. generator generally designated by reference numeral 10 and having a three-phase, Y-connected stator or output winding 12 and a field winding 14. The field winding 14 is rotatable and is driven from a shaft 16. A second dynamoelectric machine designated in its entirety by reference numeral 18 has a wound rotor 20 and a field winding 22. The machine 18 is a synchronous alternator which may be operated either as a motor or as a generator. The wound rotor 20 has a three-phase delta connection and it is rotatably driven by a shaft 24 when the machine 18 is operating as a generator, while the rotor 20 drives the shaft 24 when the machine 18 is operating as a motor.

The motor vehicle which is to use the electrical system of this invention has a main prime mover engine designated by reference numeral 26 which supplies motive power to the vehicle. A second auxiliary engine 28 drives both the dynamoelectric machines 10 and 18. To this end, the shaft 24 is mechanically coupled with shaft 16 through a V belt 30 and pulley 29. The shaft 16 is rotatable with a pulley 32 which is mechanically connected with a pulley 34 through a V belt 35. The pulley 34 is connected with the drive shaft 36 of auxiliary engine 28. The pulley 32 is mechanically connected with shaft 16 through any suitable overrunning clutch 37 which permits the shaft 16 to be driven by the engine 28 but which overruns whenever the shaft 16 is driven from the shaft 24 during the time that the dynamoelectric machine 18 is operating as a motor. Thus, when the machine 18 is operating as a generator, the engine 28 drives both generators 10 and 18 from belt 35. Whenever the machine 18 is operating as a motor, however, the engine 28 is mechanically disconnected from machines 10 and 18 so that, during this time, the motor 18 will drive the generator 10.

The engines 26 and 28 may be of any type, such as gas turbine, steam turbine and the like, but, for purposes of description, will be considered as internal combustion engines requiring ignition which is supplied respectively to the engines through leads 40 and 42. It is important, however, that the engine 28 be operated at constant speed so that the machine 18 will be driven at a constant speed to produce an A.C. voltage of constant frequency during the time that it is operating as a generator. To this end, the engine 28 is provided with a suitable governor schematically shown and designated by reference numeral 44. The governor, as is well known to those skilled in the art, operates to control the amount of power medium fed to the engine as a function of rotational speed of the engine. Thus, the engine 28 will be maintained at constant speed. The engine 26, on the other hand, must be operated at variable speeds in order to provide for variable speeds of movement of the motor vehicle.

The governor mechanism 44 operates an electric switch 45 to a closed position whenever the governor moves to the wide-open position. In other words, when the engine 28 is becoming very nearly overloaded or is overloaded, the governor 44 will tend to supply the maximum amount of power medium to the engine and it is at this point that the switch 45 is closed. At all other times, the switch 45 is maintained in an open position. The purpose of the switch 45 will be fully described hereinafter.

The direct-current system of the electrical system of this invention will be described first, and it includes the A.C. generator 10 as a power source. The generator 10, as has been noted hereinbefore, will either be driven by the auxiliary engine 28 or by the dynamoelectric machine 18 when it is operating as a motor. The output winding 12 of generator 10 is connected with a three-phase, full-wave bridge rectifier network designated in its entirety by reference numeral 46. This bridge rectifier circuit 46 has one output terminal connected directly to ground as shown, and has another output terminal connected with lead 47. The input terminals of the bridge rectifier network are connected with the output winding 12 via leads 48, 49 and 50. The D.C. loads of the vehicle are thus fed from a circuit that includes the output terminals of the bridge rectifier network 46. The lead 47 that forms one side of the D.C. load circuit is connected with a junction 51 which is, in turn, connected with lead 40 that forms a common connection for junctions 51, 52 and 53. The D.C. loads of the motor vehicle, in addition to the ignition loads for the engines and in addition to the storage battery 54, are designated in their entirety by reference numeral 55. These additional D.C. loads are thus connected between junction 51 and ground, as shown. These additional D.C. loads, as is well known to those skilled in the art, may include the lights for the motor vehicle and various other loads, such as heating and air conditioning equipment.

The junction 52 is connected with junction 56 via a lead 58 that forms a common connection for junctions 52, 56 and 59. The junction 56 is connected to one side of storage battery 54 while the opposite side of the storage battery is connected directly to ground. The junction 56 is also connected with lead wire 42 which provides ignition current for the prime mover 26 and is also connected with a lead 60 that provides a portion of a field circuit for the field winding 14 of generator 10. The lead 60 is connected to one side of a relay-operated switch 62, which is normally open but which closes whenever relay coil winding 64 is energized. The coil winding 64 is connected directly across a bridge rectifier network designated in its entirety by reference numeral 66. The input terminals of the bridge rectifier network 66 are connected with leads 68 and 70 which are, in turn, connected with the A.C. portion of the electrical system at junctions 72 and 74. As will become more readily apparent, the switch 62 will be closed whenever a sufficient A.C. voltage appears across junctions 72 and 74 to complete a circuit to the field winding 14 of generator 10.

One side of relay switch 62 is connected with a lead 73 which is, in turn, connected with the transistor voltage regulating circuit illustrated in FIGURE 2 and designated in its entirety in FIGURE 1B by reference numeral 75. The voltage regulating circuit has an output lead 76 that is connected to one side of a resistor 78. The resistor 78 is connected between lead 76 and a lead 79, which is connected to one side of field winding 14. The opposite side of the field winding 14 is connected directly to ground, as shown. The resistor 78 is connected across a relay-operated switch 80 which is normally closed, but which opens whenever relay coil 82 is energized from terminal 53 and through a switch 84. A third lead wire 86 is connected with voltage regulating circuit 75 and is connected directly to ground via a lead 88. It thus is apparent that when switch 84 is closed and when switch 45 is closed, the coil 82 will be energized to open switch 80 and place the resistor 78 in series with the field winding 14 to cut down the current flow through the field winding. Thus, should the generator 10 become highly loaded so as to overload the auxiliary engine 28, the governor mechanism 44 will operate to close switch 45 and thus bring about a series of events which places the resistor 78 in series with the field 14 to cut down the output of the generator 10 until the load is back to normal. The switch 84 may be operated manually or may be operated in response to oil pressure of the auxiliary engine 28. It is normally in an open position but must be closed whenever the engine 28 is running. This switch thus prevents the closing of contact 80 when the engine is not running and this may be either done manually or in response to operation of the engine.

The field current through field winding 14 is controlled as a function of the conductance of transistors 90 and 92 illustrated in FIGURE 2. These transistors are both of the PNP type and each have an emitter electrode $e$, a base electrode $b$, and a collector electrode $c$. Thus, the current through field winding 14 is controlled by a circuit that may be traced from lead 58 through lead 60, through switch 62, through lead 73, through resistor 94, through a silicon diode 96, through the emitter-to-collector paths of transistors 90 and 92, through lead 76, and from lead 76 through field winding 14 to ground. The circuit from lead 76 through the field winding 14 to ground may either be through the resistor 78 or through the switch 80, as has been described hereinbefore.

The regulating circuit of FIGURE 2 is the same as that described and claimed in copending application S.N. 707,200, filed January 6, 1958. Briefly, this circuit includes a voltage divider network comprised of resistors 98, 100 and 102 which are connected between leads 73 and 86. The resistor 100 is tapped at 104 and this tap point may be shifted as is well known to those skilled in the art to change the setting of the voltage regulating circuit. The tap point 104 is connected by a Zener diode 106 and is connected to one side of condensers 108 and 110. The opposite side of Zener diode 106 is connected with a junction 112 and with the base electrode $b$ of a PNP transistor 114. The junction 112 is connected with a resistor 116 which is, in turn, connected with the emitter electrode $e$ of transistor 114 through lead 118. The resistor 116 is also connected with junction 120 located between resistor 94 and p-n junction semiconductor diode 96, which may be of the silicon type.

The collector electrode $c$ of transistor 114 is connected with a resistor 122, the opposite side of which is connected with lead 124. The resistor 122 is also connected with a junction 126 which is, in turn, connected to one side of resistors 128 and 130. The opposite side of resistor 128 is connected with the base electrode $b$ of transistor 92 while the opposite side of resistor 130 is connected with the base electrode $b$ of transistor 90. The collector electrode $c$ of transistors 90 and 92 is connected with junction 132 which is, in turn, connected with lead wire 134. The lead wire 134 is connected with lead 76 and with one side of condenser 108. A diode 136 is connected between lead 124 and lead 76, and this diode operates to suppress transient voltages which appear across the field winding 14. The emitter electrodes of transistors 90 and 92 are connected to junction 138 which is, in turn, connected with junction 140. A resistor 142 is connected between junction 140 and lead 124.

As has been more fully described in the above-mentioned copending application, the transistors 90 and 92 operate to control the field current through field winding 14. This is accomplished by varying the conduction of transistors 90 and 92. The conduction of transistors 90 and 92 is controlled as a function of the voltage appearing across leads 73 and 86. Thus, when this voltage rises above the desired regulated voltage, the transistors 90 and 92 are rendered substantially nonconductive to cut off field current. On the other hand, when the voltage appearing across leads 73 and 86 is below the desired regulated value, the transistors 90 and 92 are rendered substantially fully conductive to provide for increased field current through field winding 14 of generator 10.

The conduction of transistors 90 and 92 is controlled by the voltage dividing circuit, the Zener diode 106, and the transistor 114, the cooperation of which have been fully described in the above-noted copending application. It thus will be apparent that the transistor regulator circuit 75 will maintain the output voltage appearing at the output terminals of bridge rectifier circuit 46 at a predetermined regulated value.

The A.C. load circuit of the electrical system of this invention is connected across junctions 72, 74 and 150 which are, in turn, connected with leads 152, 154 and 156. The A.C. loads for the motor vehicle are designated by reference numeral 158 and may take the form of fluorescent lights and the like, or any other A.C. load that is to be operated by 60-cycle alternating current or other constant frequency alternating current. The junctions 72, 74 and 150 are also connected with leads 160, 162 and 164. These lead wires are connected to one side of switches 166, 168 and 170, the opposite sides of the switches being connected respectively with leads 172, 174 and 176. The leads 172, 174 and 176 are connected with the output terminals of the three-phase delta-wound rotor 20 of dynamoelectric machine 18. These leads are also connected with leads 178, 180 and 182. The switches 166, 168 and 170 are controlled by a relay actuating coil 184. These switches are normally held in an open position except when relay actuating coil 184 is energized. One side of relay actuating coil 184 is connected directly to ground, whereas the opposite side of this coil is connected with a relay actuating coil 186 that controls relay switches 190 and 192. The switches 190 and 192 are normally maintained open except when relay actuating coil 186 is energized. The opposite side of relay actuating coil 186 is connected with a lead 194 which is, in turn, connected to one side of a manually operable switch 196.

The leads 178, 180 and 182 are connected with junctions 200, 202 and 204 of a motor starter circuit generally designated by reference numeral 206. The motor starter circuit is of a conventional type that includes switches 208, resistors 210, and switches 212. The switches 208 may be manually or otherwise operated, and are connected with leads 214, 216 and 218. The leads 214, 216 and 218 are connected with a disconnect switch generally designated by reference numeral 220, and including switch blades 222. The switch blades 222 are manually actuated to close a circuit between leads 224, 226 and 228 and the lead wires 214, 216 and 218. The lead wires 224, 226 and 228 are connected with a suitable 220-volt, three-phase supply through any type of conventional connector. Thus, the lead wires 224, 226 and 228 may be plugged into a conventional 220-volt outlet. The lead wires 214, 216 and 218 are also connected with lead wires 230, 232 and 234. These lead wires are connected with lead wires 236, 238 and 240 through relay operated switches 242, 244 and 246. The relay-operated switches are normally open, but are closed whenever relay actuating coil 248 is energized. The relay actuating coil 248 is connected between ground and a lead 250.

The leads 236, 238 and 240 are connected with windings 252, 254 and 256 of 220 to 110 volt step-down, auto-transformer generally designated by reference numeral 258. The windings of the transformer are tapped at 260, 262 and 264. The tap point 260 is connected with lead 152, whereas the tap points 262 and 264 are connected respectively with leads 156 and 154.

The lead wires 160, 162 and 164, which in FIGURE 1B, are connected with leads 270, 272 and 274, which connect with a voltage sensing unit designated in its entirety by reference numeral 276 and shown in FIGURE 3 of the drawings. The voltage sensing unit includes a step-down transformer designated in its entirety by reference numeral 278 and including primary windings 280, 282 and 284. The transformer has secondary windings 286, 288 and 290. The secondary windings have a lesser number of turns than the primary windings so that a predetermined step-down in voltage is achieved between primary and secondary. It is readily seen from FIGURE 3 that the primary windings 280 and 284 are connected across leads 270 and 274, whereas the primary windings 280 and 282 are connected across leads 272 and 274. The secondary windings of the transformer 278 are connected with a bridge rectifier network designated in its entirety by reference numeral 290 and including six dry rectifiers connected as shown. The rectifier circuit 290 rectifies the three-phase output of the secondary windings of the transformer 278 and applies this direct-current voltage across leads 292 and 294. The voltage sensing circuit of FIGURE 3 thus converts the three-phase input at leads 270, 272 and 274 to a lower voltage D.C. output which appears across leads 292 and 294. This D.C. voltage appearing across leads 292 and 294 will, of course, have a ripple component of 360 cycles per second.

The lead 292 of voltage sensing circuit 276 is connected to one side of a relay operated switch 192, whereas the lead 294 of voltage sensing circuit 276 is connected with a transistor voltage regulating circuit generally designated by reference numeral 302 and shown in detail in FIGURE 4 of the drawings. The transistor regulator circuit shown in FIGURE 4 and in FIGURE 1B has a lead wire 304 which is connected directly to ground, as shown. The regulating circuit 302 further has a lead wire 306 which is connected with the junction 59 and is thus connected to one side of the D.C. load circuit. The regulating circuit 302 further has a lead 308 that is connected to one side of relay operated switch 190. The opposite side of relay operated switch 190 is connected with a lead 310 which is, in turn, connected with lead 312 at junction 314. The sense voltage for the regulating circuit of FIGURE 4 is applied to the regulating circuit via leads 320 and 294.

The lead 310 which connects with junction 314 and one side of relay operated switch 190 is connected with a junction 322. The junction 322 is connected to one side of a potentiometer 324, the opposite side of the potentiometer being connected to one side of a relay operated switch 326 via lead 328. The relay operated switch 326 is operated by a relay actuating coil 330 which also operates switch 332. The switch 332 is normally closed while the switch 326 is normally open during the time that relay coil 330 is deenergized. When the relay coil 330 is energized, the switch 326 is closed and the switch 332 is opened and the relay is preferably arranged so that switch 326 closes just before switch 332 opens. The resistor 324 is a power factor adjusting resistor for use when the dynamoelectric machine 18 is being operated as a motor. A discharge resistor 340 is connected between switch 332 and ground. The actuating coil 330 is connected between ground and junction 342 through a manually operable switch 344. It will be apparent that when switch 344 is closed, the switch 326 is closed and the switch 332 is opened.

The transistor regulating circuit of FIGURE 4 operates to maintain the output voltage of machine 18 at a predetermined level when it is operating as a generator. This circuit includes the lead wires 294 and 320 which form the input terminals of the regulating circuit from the sensing unit 276. It is seen that the lead wire 320 is connected with junctions 350 and 352 and is also connected with one side of resistor 354 of a voltage dividing network that includes resistors 354, 356 and 358. The resistor 356 has a movable tap 360 which may be moved to adjust the voltage regulating point of the regulator circuit. A condenser 361 is connected between junctions 350 and 362, the junction 362 being connected with lead 294. The lead 294 forms a common connection for junctions 362, 364, 366 and 368. The tap point 360 is connected with a junction 370 which is, in turn, connected to one side of a Zener diode 372. The Zener diode has the well-known characteristic of preventing reverse current flow therethrough until a predetermined voltage is impressed across it, whereupon it conducts and operates as a constant voltage device. The opposite side of Zener diode 372 is connected with a junction 374. A resistor 376 is connected between junctions 374 and 368, whereas a condenser 378 is connected between junctions 366 and 370. A condenser 380 is also connected between junction 352 and junction 382.

The regulating circuit of FIGURE 4 further includes transistors of the PNP type designated by reference numerals 384, 386, 388 and 390. Each transistor has an emitter electrode $e$, a base electrode $b$ and a collector electrode $c$. The emitter electrodes of transistors 388 and 390 are connected with junction 394 via lead 396. The collector electrodes of transistors 388 and 390 are connected with junction 398 and with junction 400. The base electrodes are connected together at junction 402 through resistors 404 and 406. A resistor 408 is connected between junction 394 and junction 410 which is connected with lead wire 306. A diode 412 is connected between lead 304 and junction 400 and serves to dampen transient voltage changes which appear across the field winding 22 which is connected across this diode.

The collector electrode of transistor 386 is connected with a junction 420 through a resistor 422. The emitter electrode of transistor 386 is connected with junction 424 and a resistor 426 is connected between junction 424 and junction 428. The junction 428 is connected with a lead 430 which also connects junction 394 and the emitter electrode of transistor 384. The base electrode $b$ of transistor 386 is connected with the collector electrode $c$ of transistor 384 through a lead 432. This connection is made at junction 434 and a resistor 436 is connected between junction 434 and junction 420. A condenser 440 is connected between junction 370 and junction 400.

It will be apparent from the foregoing description that the A.C. loads 158 of the motor vehicle may be supplied either from generator 18 or from the 202-volt source that is connected with lead wires 224, 226 and 228. Assuming that, first of all, it is desired to operate the electrical system without operation of the driving engine and without movement of the motor vehicle, the lead wires 224, 226 and 228 will be connected with a suitable 220-volt supply. During this mode of operation, the dynamoelectric machine 18 will be operated as a motor to drive the generator 10 and the auxiliary engine 28 will be disconnected from both generators. When it is desired to bring about such an operation, the switch 196 is opened, or, if open, is maintained in an open position. Switch 344 is closed after the synchronous motor 18 has pulled into step or is at the maximum speed that it will attain before pulling into step. Switch 344 may be closed manually or automatically after a suitable time delay or where the voltage induced in field winding 22 reduces to zero as is well known to those skilled in the art. The closure of switch 344 operates to close switch 326 and to open switch 332. The closure of switch 326 completes a circuit from lead wire 58 through relay actuating coil winding 248 to ground to cause the closure of switches 242, 244, and 246. With switches 242, 244 and 246 closed, power is fed to auto-transformer 258 from the 220-volt source through leads 236, 238 and 240. The auto-transformer changes the 220-volt input to 110-volt output which appears across leads 152, 154 and 156. The voltage across these last-mentioned leads is thus available for operation of the A.C. loads designated by reference numeral 158. The A.C. loads in this mode of operation are then supplied from the 220-volt source to the loads through the transformer 258.

The A.C. voltage for operating the machine as a motor which energizes the rotor winding 20 is supplied through motor starter 206 from the A.C. source and through lead wires 178, 180 and 182. This A.C. voltage will be supplied through the resistors 210 in two lines of the three-phase source and these resistors will be short-circuited when the switches 212 are closed. The switches 212 are closed by any suitable means after the motor 18 has picked up some speed. The switches, for example, might be centrifugally operated or operated in any other conventional manner.

During the time that the machine 18 is operating as a motor, it derives field power through a circuit that may be traced from lead 58 through switch 326, through lead 328, through resistor 324, through lead 310, and thence through lead 312 to the field winding 22. The field current will be supplied from the D.C. system and will be of a value determined by the resistance of the field winding 22 and by the setting of the resistor 324.

Resistor 340 serves as a discharge resistor to limit the voltage induced in field winding 22 to a safe value during starting and at the opening of switch 326, and also serves to improve the starting torque of the motor. Resistor 340 is removed from the circuit by the opening of switch 332 when switch 344 is closed. It will be appreciated that, when the machine 18 is operating as a motor, it is supplied with 220-volt, 60-cycle, three-phase voltage directly from the motor starter 206, whereas the field winding is supplied from the direct-current system. During the time that the machine 18 is being operated as a motor, the switch contacts 166, 168 and 170 will, of course, be open as the relay coil 184 is not energized due to the open position of switch 196. With the machine 18 thus operating as a motor, the generator 12 is driven to supply A.C. voltage to the bridge rectifier network 46 and this voltage will be controlled by the transistor voltage regulator circuit 75 in the same manner as if the generator 10 were being driven by the auxiliary engine 28. During the time that the machine 18 is being operated as a motor, the A.C. transistor regulating circuit 302 is not in operation and is effectively disconnected from the circuit because the switches 190 and 192 are at this time open due to the fact that the relay coil 186 is deenergized.

When the auxiliary engine 28 is operating, the A.C. voltage for supplying the A.C. loads 158 is supplied by machine 18, now operating as a generator rather than as a motor. During this time, the switch 344 is opened and maintained open, whereas the switch 196 is closed. The opening of switch 344 causes the opening of switch 326 and the closure of switch 332. When switch 332 closes, it will form an instantaneous discharge path through resistor 340 for field winding 22 of machine 18. The closure of switch 196 will cause relay coils 184 and 186 to be energized from lead 58. The energization of these relay coils will cause the closure of relay actuated switches 190 and 192 and will cause the closure of relay actuated switches 166, 168 and 170. With relay switch contacts 166, 168 and 170 closed, the A.C. loads 158 are supplied from the output winding 20 of the dynamoelectric machine 18. The closure of switch contact 190 completes a circuit between lead wire 308 of transistor regulator circuit 302 and lead 310 which, in turn, will supply current to lead 312 and the field winding 22. The closure of switch 192 connects leads 292 and 320 so that the sensing unit 276 will now supply direct-current voltage to the transistor regulating circuit 302. Thus, during the time that the auxiliary engine 28 is driving both generators 10 and 18, the generator 18 is supplying A.C. voltage to the A.C. loads 158 and this voltage will be maintained at some predetermined level by transistor regulator circuit 302. The voltage output of the generator 20 will, for example, be 120-volt, 60-cycle. This output will be of a constant frequency as the engine 28 is driven at constant speed. Thus, for example, if the engine is driven at a constant 3600 r.p.m., the generator 18 will have two poles and will consequently operate at 3600 r.p.m. when it is being operated as a motor. It will also be readily apparent that the generator 10 will be driven at this time by the engine 28 through the overrunning clutch 37.

The circuit of this invention preferably includes means for protecting the A.C. loads from an under frequency condition of machine 18 when it is operating as a generator. This means might include any circuitry for opening the field or output circuit of machine 18 when its frequency falls below a predetermined value for example 55 cycles per second. In the FIGURE 1B, this circuitry includes a governor operated switch 450 operated by governor weights 452 that are responsive to the speed of rotation of shaft 24. The weights maintain the switch 450 open until the shaft is rotating at such a speed as to cause the machine 18 operating as a generator to have an output of a frequency greater than 55 c.p.s. The switch 450 is shunted by a switch 454 which will be closed when machine 18 is operating as a motor and will be opened when machine 18 operates as a generator. Thus, if the generator is putting out too low a frequency, the field circuit of machine 18 will be opened to cut off the A.C. output.

As noted hereinbefore, the transistor regulator circuit 302 maintains the A.C. output voltage of machine 18 at a predetermined level during the time that it is operating as a generator. This circuit, as has been noted hereinbefore, is supplied with a direct-current voltage from voltage sensing unit 276 and this voltage has a certain ripple frequency which, in this case, is 360 cycles per second. This direct-current voltage is applied across leads 294 and 320 of the transistorized regulating circuit illustrated in FIGURE 4. The condenser 361 of this circuit tends to smooth out this ripple voltage and sharpen the regulating characteristics of the regulating circuit.

It will be readily apparent from an inspection of FIGURE 4 that a portion of voltage appearing across leads 320 and 294 is impressed between junction 360 and junction 364. This voltage will be proportional to the output voltage of generator 18 and is used to control the conduction of transistors 384, 386, 388 and 390. Assuming that the voltage between junctions 360 and 364 is higher than normal so as to reflect a high voltage output condition of the generator, the Zener diode 372 will become conductive and base current flow will occur between the base electrode of transistor 384 and junction 360. This base current flow between the emitter and base electrodes of transistor 384 will cause an emitter-to-collector current in transistor 384 which flows toward junction 420 and through resistor 436. This is true because the emitter-to-collector current of transistor is proportional to emitter-to-base current flow.

With transistor 384 conducting from emitter to collector, the base current flow from emitter to base in transisor 386 will be greatly reduced due to the fact that transistor 384 will shunt current away from transistor 386. The transistors 384 and 386 thus operate in opposite directions in that, when transistor 384 is conducting, transistor 386 is cut off and, when transistor 384 is non-conducting, transistor 386 becomes conducting.

The conduction of transistors 388 and 390 is controlled by the conduction of transistor 386. Thus, when transistor 386 is conducting from emitter to collector, base current may flow in transistors 388 and 390 through resistors 402 and 404 and through the emitter-to-collector circuit of transistor 386 to the junction 420. This emitter-to-base current conduction in transisors 388 and 390 will be accompanied by a great increase in emitter-to-collector current of these transistors and, since they are connected in series with the field winding 22 and with the direct-current voltage source of the electrical system, this increase in emitter-to-collector current will cause an increase in the output voltage of machine 18 operating as a generator. It will be apparent from the foregoing that the transistor 386 and the transistors 388 and 390 operate in the same direction, that is, increased conduction of transistor 386 causes increased conduction of transistors 388 and 390, whereas decreased conductions of transistor 386 causes a decrease in conduction of transistors 388 and 390. With the assumed high voltage condition, the conduction of transistors 386, 388 and 390 will, of course, be cut down to reduce field current in field winding 22.

When the voltage between junctions 360 and 364 is lower than that desired, the transistor 384 will become non-conductive to cause conduction in transistor 386 with a consequent increase in conduction in transistors 388 and 390. When this occurs, the field current, of course, will be increased through the field winding 22 to increase the output voltage of machine 18. It, thus, will be apparent from the foregoing that the A.C. voltage at the output terminals of generator 18 will be maintained at a constant level by varying the conduction of transistors 388 and 390 which, in turn, have their conduction controlled by the sense voltage that is applied to leads 294 and 320.

The resistor 408 is a feed-back resistor and applies a voltage between junctions 360 and 364 which subtracts from the voltage appearing across these terminals in a network that includes the emitter to base circuit of transistor 384. Thus, when transistors 388 and 390 are conducting, a voltage is developed across resistor 408 which subtracts from the voltage appearing across junctions 360 and 364. This voltage drop across resistor 408 thus affects the regulating circuit in such a manner that, when the field current is increasing, the regulating circuit senses an apparent voltage that is increasing faster than it really is. On the other hand, when the field current is decreasing, with a consequent decrease in conduction of transistors 388 and 390, this voltage drop is applied to the regulator circuit in such a manner that the regulator circuit senses a voltage that is decreasing faster than it actually is. The result of this action is that the transistors 388 and 390 are operated either substantially fully non-conductive or substantially fully conductive to reduce heat losses in the transistors and this operation is due to the fact that the regulator circuit is not stable because of the action of the voltage drop across resistor 408 which tends to drive the transistors either to their fully conductive state or their fully non-conductive state.

The condenser 380 serves an important function in the circuit illustrated in FIGURE 4 as the regulator switching action is controlled mainly by the action of this condenser. This is true because this condenser couples a small amount of the 360 c.p.s. ripple into the sensing circuit and from there into Zener diode 372. The resistor 408 tends to hold the circuit condition either on or off until the ripple trips the circuit.

In summary, when the auxiliary engine is driving both generators, the output voltage of the A.C. generator 18 will be maintained constant by the transistor regulating circuit 302, whereas the output voltage of the generator 10 will be maintained constant by the voltage regulating circuit 75, which is illustrated in FIGURE 2. It will also be apparent that both field windings of the generators 10 and 18 are supplied from the direct-current circuit of the electrical system with the field current of one winding being controlled by the regulating circuit 75 and the other winding being controlled by the regulating circuit 302. In addition, it will be apparent that field relay switch 62 will be closed by energization of relay coil 64 from bridge rectifier 66 whenever sufficient A.C. voltage appears between junctions 72 and 74. The resistor 78 connected with field winding 14 is only connected in the circuit whenever the generators and other auxiliary devices are being driven by auxiliary engine 28 and only when the auxiliary engine becomes overloaded, as has been described hereinbefore.

It will be apparent from the foregoing description that applicants have provided a motor vehicle electrical system wherein an A.C. voltage of constant frequency is present to energize the A.C. loads of the vehicle, and wherein the direct-current loads of the vehicle are energized from a second source of power. It will also be apparent that the D.C. loads of the vehicle will be energized by driving a dynamoelectric machine as a motor during the time of stationary operation of the electrical system.

While the embodiments of the present invention as hereing described, constitute preferred forms, it is to be understood that other forms might be adopted.

What is claimed is as follows:

1. In an electrical system for a motor vehicle having a variable speed prime mover engine, an A.C. load circuit for said vehicle, a D.C. load circuit for said vehicle, a dynamoelectric machine having terminals and operable as a motor when said terminals are connected with a source of A.C. voltage and operable as a generator to energize said terminals with an output A.C. voltage, means for connecting said terminals with said A.C. load circuit, means for disconnecting said terminals from said A.C. load circuit and for connecting said terminals with a source of A.C. voltage, a direct-current power supply connected with said D.C. load circuit, an auxiliary constant speed engine, and torque transmitting means connecting said auxiliary engine, said dynamoelectric machine and said direct current power source, whereby said auxiliary engine drives both said dynamoelectric machine and said direct current power source, said torque transmitting means including means for disconnecting said auxiliary engine from said dynamoelectric machine and said direct current power source whereby said dynamoelectric machine is operable to drive said direct current power source but not said auxiliary engine when the dynamoelectric machine is operating as a motor.

2. In an electrical system for a motor vehicle having a variable speed prime mover for supplying motive power to the vehicle, an A.C. load circuit for said vehicle, a D.C. load circuit for said vehicle, a first A.C. generator having a field winding connected to supply power to said A.C. load circuit, a second A.C. generator having a field winding, means connecting said second A.C. generator with said D.C. load circuit through a rectifier, a constant speed auxiliary engine drivably connected with both A.C. generators, a first voltage regulating means connected between the field winding of said first A.C. generator and said D.C. load circuit and connected to sense the voltage of said A.C. load circuit to control the output of said first A.C. generator as a function of A.C. load voltage, and a second voltage regulating means connected between said D.C. load circuit and the field winding of said second generator and connected to sense the voltage of said D.C. load circuit to control the output of said second A.C. generator as a function of D.C. load voltage.

3. In an electric system for a motor vehicle having a variable speed prime mover engine for supplying motive power to the vehicle, a D.C. load circuit including a storage battery, an A.C. load circuit, a direct current power source connected to energize said D.C. load circuit, an A.C. generator connected to energize said A.C. load circuit, an auxiliary engine drivably connected with both said direct current power source and said A.C. generator, and conductor means connecting said prime mover engine and said auxiliary engine with said D.C. load circuit for supplying ignition power to said engines from said D.C. load circuit.

4. In an electrical system for a motor vehicle, the combination comprising; an engine, a D.C. load circuit, an A.C. load circuit, an A.C. generator having a field winding and connected to energize said A.C. load circuit, a direct current power source having a field winding and connected to energize said D.C. load circuit, torque transmitting means drivably connecting said engine with said A.C. generator and with said direct current power source, a first transistor connected with said D.C. load circuit and with the field winding of said direct current power source, means for varying the conduction of said first transistor as a function of the voltage appearing across said D.C. load circuit, a second transistor connected with said D.C. load circuit and with the field winding of said A.C. generator, and means for controlling the conduction of said second transistor as a function of the voltage appearing across said A.C. load circuit.

5. In combination, a first source of power comprising, an A.C. generator having output terminals and a field winding, a voltage regulating circuit having an input sensing circuit and including at least one transistor, a second source of power including a generator providing a source of direct current, means connecting said source of direct current in series with said transistor and field winding whereby the current through said field winding is controlled by the conduction of said transistor, means connected between said input sensing circuit and said transistor for controlling the conduction of said transistor, and a rectifier connecting said A.C. generator output terminals and said input circuit.

6. In combination, a first source of power comprising an A.C. generator having output terminals and a field winding, a voltage regulating circuit having an input sensing circuit and including at least one transistor, a second source of power including a generator providing a source of direct current, means connecting said source of direct current in series with said transistor and field winding whereby the current through said field winding is controlled by the conduction of said transistor, means connected between said input sensing circuit and said transistor for controlling the conduction of said transistor, means including a rectifier for applying a D.C. voltage from the output terminals of said A.C. generator to said sensing circuit having a predetermined ripple frequency, and a condenser coupling some of the ripple frequency voltage directly into said sensing circuit.

References Cited in the file of this patent

UNITED STATES PATENTS

| | | |
|---|---|---|
| 1,743,771 | Hall | Jan. 14, 1930 |
| 2,014,818 | Sparling | Sept. 17, 1935 |
| 2,046,696 | Nycum | July 7, 1936 |
| 2,075,666 | Seeley | Mar. 30, 1937 |
| 2,085,275 | Schmidt | June 29, 1937 |
| 2,280,736 | Winther | Apr. 21, 1942 |
| 2,313,931 | Geiselman | Mar. 16, 1943 |
| 2,482,588 | LeTourneau | Sept. 20, 1949 |
| 2,809,301 | Short | Oct. 8, 1957 |
| 2,859,356 | King | Nov. 4, 1958 |